Oct. 3, 1944.  J. BOLSEY  2,359,612

FILM LOADING DEVICE

Filed July 9, 1943  2 Sheets-Sheet 1

INVENTOR:
Jacques Bolsey
BY
his agent

Oct. 3, 1944.  J. BOLSEY  2,359,612
FILM LOADING DEVICE
Filed July 9, 1943  2 Sheets-Sheet 2
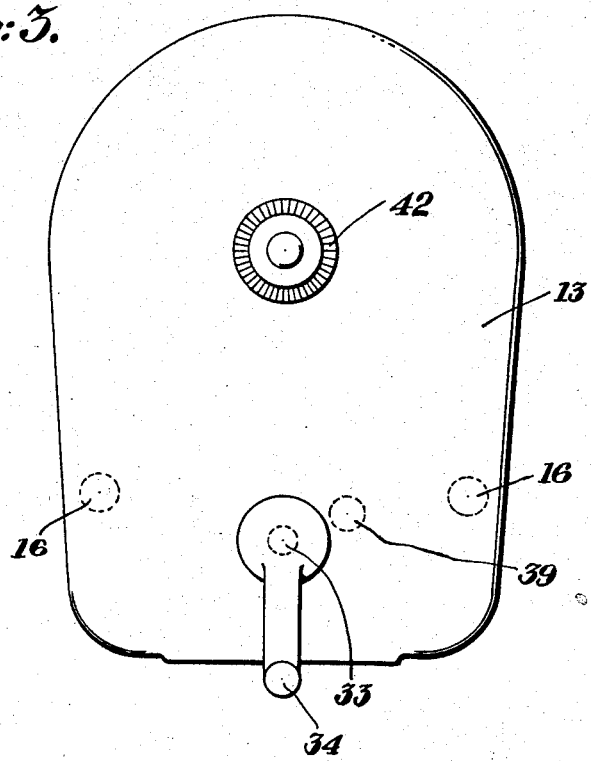
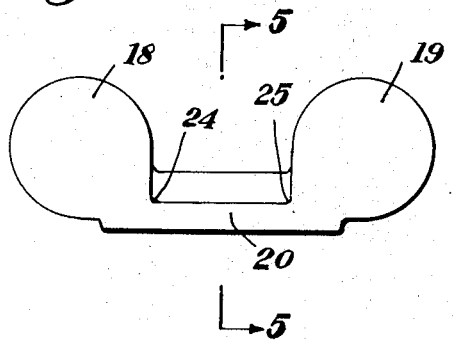
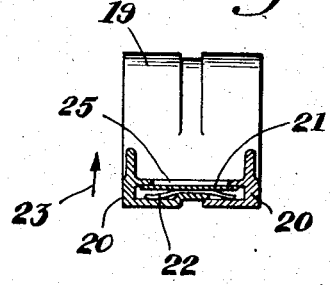
INVENTOR:
Jacques Bolsey Patented Oct. 3, 1944

2,359,612

UNITED STATES PATENT OFFICE 2,359,612

FILM LOADING DEVICE

Jacques Bolsey, New York, N. Y.

Application July 9, 1943, Serial No. 494,048

15 Claims. (Cl. 242—55)

My present invention relates to film loading devices and more particularly to devices for introducing film strips into a film magazine which is adapted to be loaded by pushing a film strip through a film receiving slot of the magazine into the same until this magazine contains a wound-up film roll of the required length.

It is an object of my present invention to provide a loading device for a film magazine which device is simple and inexpensive in construction and which can be quickly and easily operated in daylight.

It is a further object of my present invention to provide a loading device which enables severing of the film strip after the magazine is loaded.

Still a further object of my present invention consists in a film loading device which is adapted to contain a film reel with a film strip sufficient for several loadings of a magazine.

Another object of my present invention is a loading device adapted for loading a film magazine which is loaded by pushing a film strip through a film receiving slot of the magazine until this magazine contains a wound-up film roll of the required length.

With the above objects in view, my present invention mainly consists of a daylight film loading device which comprises a series of new features combined in such a manner as to enable attaining of the above objects. Thus, my new loading device comprises in combination a casing provided with a light-tight film compartment for the film strip to be introduced into the film magazine, a preferably slot-shaped opening in this casing through which the film strip moves while it is transferred from the film compartment into the film magazine, and film transporting means combined with this slot-shaped opening for moving the film strip through this opening from the film compartment into the film magazine when the same is placed adjacent to the casing with its film receiving opening superimposed on the opening in the casing. Thus, this film transporting means pushes the film strip through the slot-shaped opening in the casing into the film receiving opening of the film magazine and loads this magazine by forming a wound-up film roll within the same.

Of course, various specific embodiments of my new film loading device are possible. Thus, for instance, it is advantageous to construct the new film loading device in such a manner that it comprises a film compartment and a magazine compartment; preferably, the film compartment is provided with a cover adapted to close this compartment light-tightly while it contains the film to be introduced into the film magazine; the magazine compartment is preferably open on at least one side and has a shape enabling introduction of the film magazine into this compartment with at least that part of the magazine which surrounds the film receiving slot of the magazine contacting the inner surface of the magazine compartment, thereby preventing light from reaching the film strip while it is transferred from the film compartment into the magazine arranged in the magazine compartment.

Furthermore, it is possible to provide in the casing a narrow film channel having a substantially slot-shaped cross section and connecting the film compartment with the magazine compartment; preferably, this channel is constructed and arranged in such a manner as to form in the magazine compartment a film delivering slot positioned so as to be adapted to cooperate with the film receiving slot of the film magazine when the latter is introduced into and arranged in this magazine compartment in operative film loading position. A separate light trap might be associated with this film channel for preventing light from reaching the film compartment; however, it is also possible to omit such a separate light trap and to shape the channel in such a manner as to prevent light from passing through it.

The above mentioned film transporting means might comprise in combination a film transporting sprocket being associated with the above mentioned film channel and film delivering slot and adapted to engage the film strip, hand-operated means for rotating this sprocket in such a manner as to move the film strip from the film compartment through the film channel and film delivering slot into the film receiving slot of the film magazine when the same is arranged in the magazine compartment in operative film loading position, and film guiding means adapted to hold the film strip in engagement with the film transporting sprocket at least during operation of the film loading device. This film guiding means might be constructed in the most different ways; a particularly satisfactory construction will be described below in detail.

A further important feature of my present invention consists in hand-operated film cutting means built into the new film loading device and adapted to cut off the film strip between the film transporting sprocket and the film delivering slot after a film strip of sufficient length has been transferred from the film compartment into the film magazine arranged within the magazine compartment of my new device.

The novel features which I consider characteristic for my invention are set forth in particular in the appended claims. The invention itself, however, both as to its construction and its method of operation, together with additional objects and advantages thereof, will be best understood from the following description of specific embodiments, when read in connection with the accompanying drawings in which:

Figure 3 is a top view of my new loading device with the cover closing the film compartment;

Figure 4 is a side view of a film magazine adapted to be loaded with my new film loading device; and Figure 5 is a cross section of the film magazine shown in Figure 4, along line 5—5 of that figure.

Figure 1:
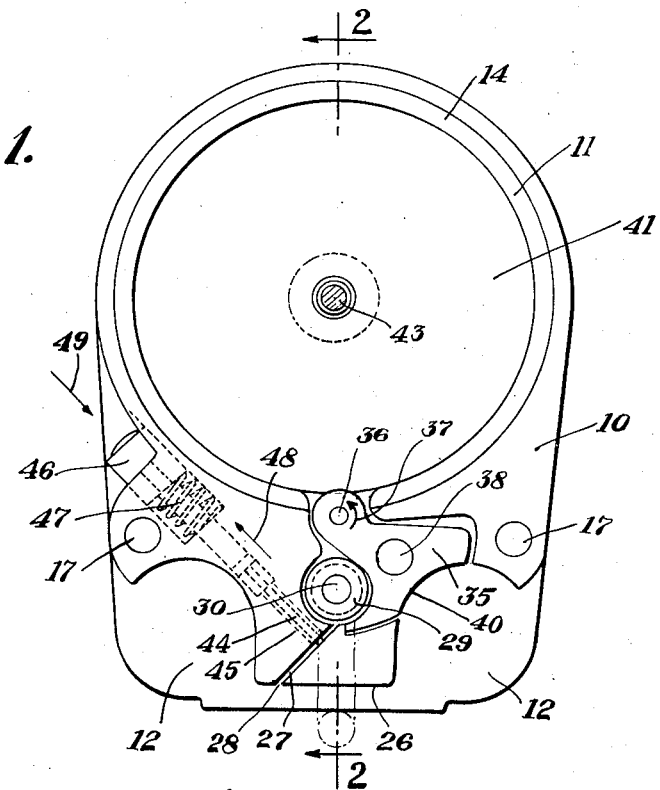
Figure 1 is a top view of my new film loading device with the cover removed, seen in direction of arrow 1 in Figure 2.
Figure 2:
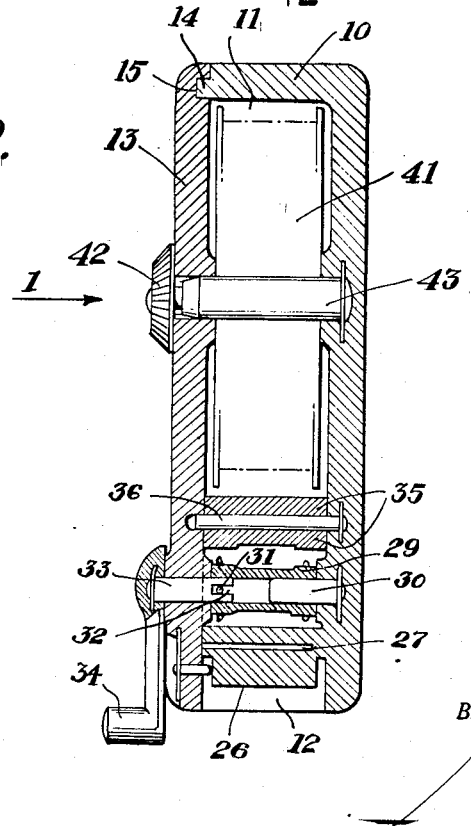
Figure 2 is a longitudinal section of the film loading device shown in Figure 1, along line 2—2 of Figure 1.

As shown in Figures 1 and 2, my new film loading device mainly comprises a casing 10 containing the film compartment 11 and the magazine compartment 12. Cover 13 is adapted to light-tightly close the film compartment 11, as shown in Figure 3. Preferably, the cover opening of film compartment 11 is encircled by a rib 14 that projects into an annular recess 15 in the inner face of cover 13 so that light cannot enter into the film compartment 11 through the cover opening. Proper placing of the cover 13 on casing 10 is assured by pins 16 arranged on the inner face of the cover and reaching into corresponding holes 17 provided in the casing 10.

The magazine compartment 12 which is open at one side has substantially the shape of the film magazine shown in Figures 4 and 5. This magazine consists of two film containers 18 and 19 connected by a channel-shaped member 20 housing the pressure plate 21 and the spring 22 pressing plate 21 in direction of arrow 23. When the pressure plate 21 is moved against action of this spring 22, at both ends of the plate 21 film receiving slots 24 and 25 are formed through which a film strip may be introduced into the magazine. At least one of the two film containers 18 and 19 is provided with means forming a wound-up film roll in the respective container when the film strip is pushed through the corresponding film receiving slot 24 or 25. I wish to stress that this magazine per se does not form part of my present invention; nevertheless, its detailed description seems necessary for proper understanding of the mode of operation of the new loading device claimed in the annexed claims.

Comparison of the shape of the magazine compartment shown in Figures 2 and 3 with that of the magazine shown in Figures 4 and 5 will clearly prove that the magazine fits into compartment 12 in such a manner that the wall portion around the film receiving slots 24 and 25 contacts the protruding portion 26 of casing 10, thereby preventing light from reaching the film receiving slots 24 and 25 when the magazine is arranged in compartment 12 in film loading operative position.

As shown in Figure 2, the casing is provided with a slot-shaped channel 27 reaching substantially from the light-tight film compartment 11 into the open magazine compartment 12 and ending in this latter compartment in a film delivering slot 28 cooperating with one of the film receiving slots 24 and 25 of the magazine. Preferably, this film delivering slot 28 is arranged in such a manner as to lie superimposed on slot 24 or 25 when the magazine is placed in operative film loading position in compartment 12.

The film transporting sprocket 29 is combined with the film channel 27 in such a manner as to transport a film strip from film compartment 11 into magazine compartment 12 when required. Sprocket 29 is freely turnably supported by shaft 30 and provided with pin 31 engaging slot 32 of the stem 33 of crank 34. By turning this crank 34, sprocket 29 is rotated and the film strip engaging the sprocket is transported from the film compartment 11 into the magazine compartment 12.

Preferably, I combine with this sprocket 29 film guiding means; this film guiding means consists of a lever-shaped film guiding member 35 turnably pivoted by means of pivot 36 to casing 10 in such a manner as to be adapted to be turned between operative position shown in Figure 2 near to sprocket 29, forcing the film strip into engagement with the sprocket, and inoperative position turned in direction of arrow 37 farther from sprocket 29, leaving a free space between this sprocket 29 and guiding member 35 for introducing the film strip to be transported from the film compartment 11 into the magazine compartment 12. In order to insure that the guiding member 35 is in proper operative position near sprocket 29 during operation of the loading device, I provide in member 35 a hole 38 cooperating with a corresponding pin 39 in cover 13 in such a manner that pin 39 may enter hole 38 only if cover 13 is properly placed on casing 10 light-tightly closing compartment 11 within the same. This ensures that guiding member 35 is always in operative position when cover 13 is correctly placed on casing 10. It should be noted that a further guarantee for proper positioning of the guiding member 35 during loading is provided by wall 40 of this guiding member; this wall is shaped in such a manner as to permit introduction of the magazine into compartment 12 only when guiding member 35 is in proper operative position.

It is evident and needs not be explained in detail how the film strip is transported by the above described sprocket 29 and guiding member 35 from film compartment 11 into the film magazine place in the magazine compartment 12. Nevertheless, it might be said that first a film reel 41 with the film strip is placed into the magazine compartment 11, then the leading end of the film strip is introduced into the film channel 27 engaging sprocket 29, and then the cover 13 is placed in proper position on casing 10, thereby forcing guiding member 35 also into proper operative position holding the film strip in engagement with the sprocket 29. After fastening of cover 13 by means of the screw-threaded knob 42 and shaft 43 to casing 10 and attaching crank 34 to sprocket 29, the magazine can be introduced into compartment 12 and the film strip transferred by rotating crank 34 from film reel 41 through film channel 27 and the film delivering slot 28 into the film compartment 12 and through film receiving slot 24 of the magazine into film container 18, forming in this container, by aid of means not shown in the drawings, a wound-up film roll and thus loading the magazine with a film strip of required length.

However, it is evident that the film container 18 of the film magazine cannot receive the entire film which is on reel 41 in film compartment 11, as it is too small therefor. Thus, it is necessary to sever the film strip after loading of the magazine. This is done by means of a film cutting device of very simple construction. Part of this cutting device consists of a cutting blade 44 sliding in slot 45. This slot 45 crosses the film channel 27, as shown in Figure 2. The blade 44 is connected with knob 46; this knob 46 is combined with spring 47, forcing knob 46 and blade 44 in direction of arrow 48, thus holding the blade 44 in inoperative not-cutting position not crossing the film channel 27.

The cutting device is operated by pushing knob 46 in direction of arrow 49, thereby forcing blade 44 to cross the film channel 27 and, after the magazine is loaded, to cut off the film strip passing through this channel. After cutting off the film strip, the cutting device returns by action of a spring 47 into inoperative position, leaving the film passage 27 free for transferring a further portion of the film strip from the film compartment 11 into magazine compartment 12 and into the film magazine arranged within this compartment.

Although above I have described in detail only those features which are claimed in the annexed claims, there are some quite important features of my new film loading device which should be mentioned at least shortly. Thus, for instance, it should be noted that I might combine with my new film loading device means for indicating the length of the film strip wound up on reel 41 in film compartment 11. There also might be provided means for preventing unwanted sliding out of the magazine from compartment 12. It is also sometimes necessary to provide means by which the two magazine parts of which the magazine consists are moved from each other during introduction into the magazine compartment 12 in order to make the slots 24 and 25 wide enough for receiving the film strip introduced into one of them by the film transporting means described above.

It will be understood that each of the elements described above, or two or more together, may also find a useful application in other types of film loading devices differing from the types described above.

While I have illustrated and described the invention as embodied in film loading devices, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and therefore such adaptations should and are intended to be comprehended within the meaning and range of equivalence of the following claims.

What I claim as new and desire to secure by Letters Patent is:

1. A daylight film magazine loading device for introducing an unexposed film strip into a film magazine adapted to be loaded by pushing said unexposed film strip into a film receiving slot of said film magazine until said film magazine contains a wound-up unexposed film roll of the required length, comprising a film containing casing provided with a light-tight film compartment, a light tight slot in said film containing casing, and film transporting means in said film containing casing for pushing said unexposed film strip through said light tight slot from said film compartment in said film containing casing into said film receiving slot of said film magazine when said film magazine is placed adjacent to said casing with its film receiving slot superimposed on said light tight slot in said film containing casing.

2. A film loading device for introducing a film strip into a film magazine adapted to be loaded by pushing said film strip into a film receiving slot of said film magazine until said film magazine contains a wound-up film roll of the required length, comprising a casing provided with a light-tight film compartment, a removable cover for said casing, a slot in said casing, a film transporting sprocket in said casing for pushing said film strip through said slot, hand operated means for rotating said sprocket, a film guiding member for holding said film strip in engagement with said sprocket at least during operation of said film loading device, means turnably attaching said film guiding member at its one end to said casing in such a manner that said guiding member is adapted to move between operative position near said film transporting sprocket, forcing the film strip passing between said member and said sprocket into engagement with the latter, and inoperative position farther from said sprocket, leaving sufficient space between said member and said sprocket for introducing said film strip between the same, and means holding said guiding member in operative position near said film transporting sprocket while said cover is in place on said casing closing the film compartment within the same.

3. A daylight film magazine loading device for introducing an unexposed film strip into a film magazine adapted to be loaded by pushing said unexposed film strip into a film receiving slot of said film magazine until said film magazine contains a wound-up unexposed film roll of the required length, comprising a casing provided with a light-tight film compartment, a light tight slot in said casing, a film transporting sprocket in said casing for pushing said film strip through said light tight slot, hand-operated means for rotating said sprocket, and hand-operated film cutting means built into said casing and adapted to cut off said unexposed film strip between said film transporting sprocket and said light tight slot in said casing after an unexposed film strip of sufficient length has been moved from said casing into said film magazine.

4. A film loading device for introducing a film strip into a film magazine adapted to be loaded by pushing said film strip into a film receiving slot of said film magazine until said film magazine contains a wound-up film roll of the required length, comprising a casing provided with a light-tight film compartment, a removable cover for said casing, a slot in said casing, a film transporting sprocket in said casing for pushing said film strip through said slot, hand-operated means for rotating said sprocket, a film guiding member for holding said film strip in engagement with said sprocket at least during operation of said film loading device, means turnably attaching said film guiding member at its one end to said casing in such a manner that said guiding member is adapted to move between operative position near said film transporting sprocket, forcing the film strip passing between said member and said sprocket into engagement with the latter, and inoperative position farther from said sprocket, leaving sufficient space between said member and said sprocket for introducing said film strip between the same, means holding said guiding member in operative position near said film transporting sprocket while said cover is in place on said casing closing the compartment within the same, and hand-operated film cutting means built into said casing and adapted to cut off said film strip between said film transporting sprocket and said slot in said casing.

5. A film loading device for introducing a film strip into a film magazine adapted to be loaded by pushing said film strip into a film receiving slot of said film magazine until said magazine contains a wound-up film roll of the required length, said device comprising a casing provided with a film compartment and a recess shaped to receive said film magazine, said film compartment being light-tightly closed and said recess being open at least on one side and having a shape enabling introduction of said film magazine into said recess with at least that part of said film magazine which surrounds said film receiving slot of said film magazine contacting the inner surface of said recess, a narrow film channel connecting said light-tight film compartment with said open recess, a film transporting sprocket adapted to move said film strip through said narrow film channel, and hand-operated means for rotating said sprocket in such a manner as to move said film strip from said film compartment through said film channel into said recess and through said film receiving slot of said film magazine into said magazine when the same is arranged in said open recess in operative film loading position.

6. A film loading device for introducing a film strip into a film magazine adapted to be loaded by pushing said film strip into a film receiving slot of said film magazine until said magazine contains a wound-up film roll of the required length, said device comprising a casing provided with a film compartment and a recess shaped to receive said film magazine, said film compartment being light-tightly closed and said recess being open on at least one side and having a shape enabling introduction of said film magazine into said recess with at least that part of said film magazine which surrounds said film receiving slot of said film magazine contacting the inner surface of said recess, a cover adapted to light-tightly close said film compartment, a narrow film channel connecting said light-tight film compartment with said open recess, a film transporting sprocket adapted to engage said film strip, hand-operated means for rotating said sprocket in such a manner as to move said film strip from said film compartment through said film channel and through said film receiving slot of said film magazine into said magazine when the same is arranged in said recess in operative film loading position, a film guiding member for holding said film strip in engagement with said film transporting sprocket, means turnably pivoting said film guiding member at its one end to said film loading device in such a manner that said guiding member is adapted to move between operative position near said film transporting sprocket, forcing the film strip passing between said member and said sprocket into engagement with the latter, and inoperative position farther from said sprocket, leaving sufficient space between said member and said sprocket for introducing said film strip between the same, and means holding said film guiding member in operative position near said film transporting sprocket while said cover is in place light-tightly closing said film compartment.

7. A daylight film magazine loading device for introducing an unexposed film strip into a film magazine adapted to be loaded by pushing said unexposed film strip into a film receiving slot of said film magazine until said magazine contains a wound-up unexposed film roll of the required length, said device comprising a casing provided with a film compartment and a magazine compartment, a film channel connecting said film compartment with said magazine compartment and being constructed and arranged in such a manner as to form in said magazine compartment a light tight film delivering slot positioned so as to be adapted to cooperate with said film receiving slot of said film magazine when said magazine is introduced into and arranged in said magazine compartment in operative film loading position, a film transporting sprocket for pushing said film strip through said film channel, hand-operated means for rotating said sprocket, and hand-operated film cutting means built into said casing and adapted to cut off said unexposed film strip between said film transporting sprocket and said light tight film delivering slot.

8. A film loading device for introducing a film strip into a film magazine adapted to be loaded by pushing said film strip into a film receiving slot of said film magazine until said magazine contains a wound-up film roll of the required length, said device comprising a film compartment and a magazine compartment, a cover adapted to light-tightly close at least said film compartment in said film loading device, a film channel connecting said film compartment with said magazine compartment and being constructed and arranged in such a manner as to form in said magazine compartment a film delivering slot positioned so as to be adapted to cooperate with said film receiving slot of said film magazine when said magazine is introduced into and arranged in said magazine compartment in operative film loading position, a film transporting sprocket for moving said film strip through said film channel, hand-operated means for rotating said sprocket, a film guiding member for holding said film strip in engagement with said film transporting sprocket, means turnably pivoting said film guiding member at its one end to said film loading device in such a manner that said guiding member is adapted to move between operative position near said film transporting sprocket, forcing the film strip passing between said member and said sprocket into engagement with the latter, and inoperative position farther from said sprocket, leaving sufficient space between said member and said sprocket for introducing said film strip between the same, means holding said film guiding member in operative position near said film transporting sprocket while said cover is in place light-tightly closing said film compartment, and hand-operated film cutting means built into said film loading device and adapted to cut off said film strip between said film transporting sprocket and said film delivering slot.

9. A film loading device for introducing a film strip into a film magazine adapted to be loaded by pushing said film strip into a film receiving slot of said film magazine until said magazine contains a wound-up film roll of the required length, said device comprising a casing provided with a film compartment and a recess shaped to receive said film magazine, said film compartment being adapted to be light-tightly closed and said recess being open on at least one side and having a shape corresponding at least partly to the shape of said film magazine, a cover adapted to light-tightly close said film compartment in said film loading device, a narrow film channel connecting said light-tight film compartment with said open recess and forming in said recess a film delivering slot, a film transporting sprocket for moving said film strip through said narrow film channel and said film delivering slot, hand-operated means for rotating said sprocket, a film guiding member for holding said film strip in engagement with said film transporting sprocket, means turnably pivoting said film guiding member at its one end to said film loading device in such a manner that said guiding member is adapted to move between operative position near said film transporting sprocket, forcing the film strip passing between said member and said sprocket into engagement with the latter, and inoperative position farther from said sprocket, leaving sufficient space between said member and said sprocket for introducing said film strip between the same, means holding said film guiding member in operative position near said film transporting sprocket while said cover is in place light-tightly closing said film compartment, and hand-operated film cutting means built into said film loading device and adapted to cut off said film strip between said film transporting sprocket and said film delivering slot.

10. A daylight film magazine loading device for introducing an unexposed film strip into a film magazine adapted to be loaded by pushing said unexposed film strip into a film receiving slot of said film magazine until said magazine contains a wound-up unexposed film roll of the required length, said device comprising a casing provided with a light-tight film compartment for the unexposed film strip to be introduced into said film magazine and an open recess for the film magazine into which said unexposed film strip is to be introduced, a light-tight film channel connecting said light-tight film compartment with said open recess, and film transporting means for pushing said unexposed film strip from said light-tight film compartment through said film channel into said recess and through said film receiving slot of said film magazine into said magazine when the same is arranged in said magazine compartment in operative film loading position.

11. A daylight film magazine loading device for introducing an unexposed film strip into a film magazine adapted to be loaded by pushing said unexposed film strip into a film receiving slot of said film magazine until said magazine contains a wound-up unexposed film roll of the required length, said device comprising a casing provided with a light-tight film compartment for the unexposed film strip to be introduced into said film magazine and an open recess for the film magazine into which said unexposed film strip is to be introduced, a light-tight film channel connecting said light-tight film compartment with said open recess and constructed so as to form in said open recess a light-tight film delivering slot, film transporting means for pushing said unexposed film strip from said light-tight film compartment through said light-tight channel into said open recess and through said film receiving slot of said film magazine into said magazine when the same is arranged in said magazine compartment in operative film loading position, and hand-operated film cutting means built into said casing and adapted to cut off said unexposed film strip between said film transporting means and said light-tight film delivering slot.

12. A daylight film magazine loading device for introducing an unexposed film strip into a film magazine adapted to be loaded by pushing said unexposed film strip into a film receiving slot of said film magazine until said magazine contains a wound-up unexposed film roll of the required length, said device comprising a casing provided with a film compartment and a magazine compartment, a film channel connecting said film compartment with said magazine compartment and being constructed and arranged in such a manner as to form in said magazine compartment a light-tight film delivering slot positioned so as to be adapted to cooperate with said film receiving slot of said film magazine when said magazine is introduced into and arranged in said magazine compartment in operative film loading position, a film transporting sprocket for pushing said film strip through said film channel, a film guiding member for holding said unexposed film strip in engagement with said pushing film transporting sprocket, hand-operated means for rotating said sprocket, and hand-operated film cutting means built into said casing and adapted to cut off said unexposed film strip between said film transporting sprocket and said light-tight film delivering slot.

13. A daylight film magazine loading device for introducing an unexposed film strip into a film magazine adapted to be loaded by pushing said unexposed film strip into a film receiving slot of said film magazine until said film magazine contains a wound-up unexposed film roll of the required length, comprising a film containing casing provided with a light-tight film compartment, a light-tight slot in said film containing casing, film transporting means in said film containing casing for pushing said unexposed film strip through said light-tight slot from said film compartment in said film containing casing into said film receiving slot of said film magazine when said film magazine is placed adjacent to said casing with its film receiving slot superimposed on said light-tight slot in said film containing casing, and a film guiding means holding said unexposed film strip in engagement with said film transporting means.

14. A daylight film magazine loading device for introducing an unexposed film strip into a film magazine adapted to be loaded by pushing said unexposed film strip into a film receiving slot of said film magazine until said film magazine contains a wound-up unexposed film roll of the required length, comprising a casing provided with a light-tight film compartment, a light-tight slot in said casing, a film transporting sprocket in said casing for pushing said film strip through said light-tight slot, a film guiding member for holding said unexposed film strip in engagement with said pushing film transporting sprocket, hand-operated means for rotating said sprocket, and hand-operated film cutting means built into said casing and adapted to cut off said unexposed film strip between said film transporting sprocket and said light-tight slot in said casing after an unexposed film strip of sufficient length has been moved from said casing into said film magazine.

15. A daylight film magazine loading device for introducing an unexposed film strip into a film magazine adapted to be loaded by pushing said unexposed film strip into a film receiving slot of said film magazine until said magazine contains a wound-up unexposed film roll of the required length, said device comprising a casing provided with a film compartment and a magazine compartment, a film channel connecting said film compartment with said magazine compartment and being constructed and arranged in such a manner as to form in said magazine compartment a light-tight film delivering slot positioned so as to be adapted to cooperate with said film receiving slot of said film magazine when said magazine is introduced into and arranged in said magazine compartment in operative film loading position, a film transporting sprocket for pushing said film strip through said film channel, a film guiding member for holding said unexposed film strip in engagement with said film transporting sprocket, and hand-operated means for rotating said sprocket.

JACQUES BOLSEY.